(12) United States Patent
Bell

(10) Patent No.: US 9,666,981 B1
(45) Date of Patent: May 30, 2017

(54) INTEGRATED ELECTRICAL HARNESS AND CONNECTOR

(71) Applicant: Bruce Bell, Whitmore Lake, MI (US)

(72) Inventor: Bruce Bell, Whitmore Lake, MI (US)

( * ) Notice: Subject to any disclaimer, the term of this patent is extended or adjusted under 35 U.S.C. 154(b) by 0 days.

(21) Appl. No.: 15/346,413

(22) Filed: Nov. 8, 2016

(51) Int. Cl.
| | |
|---|---|
| *H01R 13/627* | (2006.01) |
| *H01R 13/621* | (2006.01) |
| *H01R 13/52* | (2006.01) |
| *H01R 13/629* | (2006.01) |
| *H01R 24/66* | (2011.01) |
| *B60R 16/02* | (2006.01) |

(52) U.S. Cl.
CPC ..... *H01R 13/6215* (2013.01); *B60R 16/0207* (2013.01); *H01R 13/5219* (2013.01); *H01R 13/629* (2013.01); *H01R 24/66* (2013.01)

(58) Field of Classification Search
CPC .. H01R 13/6272; H01R 4/01; H01R 13/6275; H01R 17/12
USPC .............. 439/352, 161, 353, 357, 675, 851
See application file for complete search history.

(56) References Cited

U.S. PATENT DOCUMENTS

| 2,970,199 A * | 1/1961 | Dull ..................... H01H 19/02 200/11 EA |
| 5,315,077 A * | 5/1994 | Simon .................. H01H 19/63 200/11 R |
| 7,989,715 B2 * | 8/2011 | Saito ..................... H01H 3/62 200/313 |
| 8,263,881 B2 * | 9/2012 | Oseko .................. G01G 19/44 177/25.13 |
| 9,330,863 B2 * | 5/2016 | Pfau ..................... B60K 37/00 |

* cited by examiner

*Primary Examiner* — Phuongchi T Nguyen
(74) *Attorney, Agent, or Firm* — Thomas P. Heed; Heed Law Group PLLC

(57) ABSTRACT

The present invention is an integrated electrical harness and connector in which the connectors are annular with pins and receptacles on opposing faces. A threaded fastener can be driven through the inner diameter of each annulus, connecting the pins to the receptacles. Each annulus is attached to a rigid conduit that carries electrical wire. The conduit can be formed and sized to fit into any application. The conduit can also be integrated into motor vehicle body panels. The two annular connector halves can have a series of rims and cylinders in order to create a water-resistant connection.

27 Claims, 10 Drawing Sheets

INTEGRATED ELECTRICAL HARNESS AND CONNECTOR

FIELD OF INVENTION

This invention relates to the classification of electricity, and to one or more sub-classifications under electrically-conductive connections; structural associations of a plurality of mutually-insulated electrical connecting elements; coupling devices; current collectors. Specifically, this invention is an integrated harness and connector intended for in-vehicle applications.

BACKGROUND OF INVENTION

Over the past several decades, the amount of electronics has exploded in automobiles, pick-up trucks, commercial trucks, semi-trucks, motorcycles, all-terrain vehicles, and sports utility vehicles (collectively "motor vehicles"). Electronics are used to improve performance, control emissions, and provide creature comforts to the occupants and users of the motor vehicles. Motor vehicles are a challenging electrical environment due to vibration, heat, and longevity. Heat, vibration, and aging can all lead to connector failure. In fact, loose connectors, both in the assembly plant and in the field, are one of the largest failure modes for motor vehicles. Considering that just the aggregate annual accrual for warranty by all of the automotive manufacturers and their direct suppliers is estimated at between $50 billion and $150 billion, worldwide, a large failure mode in automotive is associated with a large dollar amount.

Considerable time, money, and energy has been expended to find connector solutions that meet all of the needs of the motor vehicles market. The current common practice is to use an eyelet and threaded fastener on all high-power connections. The current common practice is expensive, time-consuming, and still prone to failure. The current common practice is expensive mostly due to the labor involved in driving a threaded fastener into a connector in a non-standard fashion. Every connection, and every connector requiring a fastener, is seemingly different.

To add to the complexity, wiring harnesses are also variable. The installation and connection of harnesses within the motor vehicle is prone to error, expensive, and failure during the life of the vehicle. Much of the expense of a vehicle is assembly. Efforts to improve the reliability and performance of connectors and harnesses in motor vehicles invariably adds expense to assembly.

The market needs to standardize on a more appropriate, integrated connector and harness solution must be standardized. The ideal solution is one that eases manufacturing while also insuring a robust, reliable electrical connection.

PRIOR ART REVIEW

There is clearly a market demand for a mechanically simple, easy to install, lightweight, inexpensive, vibration-resistant, temperature-resistant, and robust electrical harness and connector solution. The problem is that all of these design criteria can be conflicting in current prior art. Some of the prior art has attempted to solve the problem using a peripheral spring-actuated retention feature. For example, U.S. Pat. No. 8,998,655, by named inventors Glick, et. al., entitled, "Electrical terminal" ("Glick '655") teaches an electrical terminal in which the contact element is a substantially polyhedron structure, with contact beams. A spring structure, external to the contact beams, exerts force on the contact beams. This arrangement is designed to force positive connection of the contact beams with a substantially round or square terminal pin. U.S. Pat. No. 8,992,270, by named inventors Glick, et. al., entitled, "Electrical terminal" ("Glick '270") teaches a variation on the Glick '655 patent. The reduction in the spring-actuated retention force, with heat and lifecycle, makes the connector more susceptible to wiggling loose due to vibration. Intermittent connections are also a common failure mode.

Other patents involve some sort of screwing. For example, U.S. Pat. No. 8,342,879, by named inventors Amidon et. al., entitled, "Coaxial cable connector" ("Amidon '879") teaches a coaxial screw terminal where the screw compresses the two parts to be electrically connected until they contact. Amidon '879 fails to make multiple connections at the same time and has an inefficient screwing methodology. U.S. Pat. No. 8,192,237, by named inventors Purdy et. al, entitled, "Coaxial cable connector having electrical continuity member" ("Purdy '237") teaches a coaxial cable connector with rotatable nut to tighten connector. Purdy '237 fails to make the fastener easy to screw down. Similarly, U.S. Pat. No. 7,517,233, by named inventors Xiang, entitled, "Electrical connector with improved fastener" ("Xiang '233") teaches a variation of a VGA connector with fastener to tighten it to monitor.

There are also high-voltage connectors that use a screw or another fastener. For example, U.S. Pat. No. 4,955,823, by named inventor Luzzi, entitled, "600-Amp hot stick-operable screw and pin-and-socket assembled connector system" ("Luzzi '823") teaches a high voltage pin-and-receptacle connector that attaches to high voltage cable connector through the use of a screw.

A solution is needed that improves upon the concepts of the prior art. Such a solution should combine the vibration resistance of a threaded fastener and the certain connection of a spring-loaded terminal. Additionally, such a solution should be easy to install and should be an easily standardized design.

SUMMARY OF THE INVENTION

This summary is intended to disclose the present invention, an integrated harness and connector. The embodiments and descriptions are used to illustrate the invention and its utility, and are not intended to limit the invention or its use.

The present invention has a connector portion with a male annulus containing a plurality of pins arranged in a defined pattern; and a female annulus containing a like number of receptacles arranged in an identical pattern. For an annulus, a circular arrangement of pins and receptacles is most efficient. The pins of the male annulus fit into the receptacles of the female annulus. The male annulus has a top side and a bottom side. The bottom side of the male annulus has pins arranged in a substantially circular pattern. The top side of the male annulus is a substantially planar annular surface. The male annulus has an outer surface with a defined outer diameter and an inner surface with a defined inner diameter. The female annulus has a top side and a bottom side. The bottom side of the female annulus is a substantially planar annular surface. The top side of the female annulus has the receptacles arranged in a substantially circular pattern. The female annulus has an outer surface with a defined outer diameter and an inner surface with a defined inner diameter. The outer diameter of the male annulus is larger than the outer diameter of the female annulus.

The male annulus has an outer rim and an inner rim. The male annulus outer rim has an inner cylindrical surface with an inner diameter and an outer cylindrical surface with an outer diameter. The male annulus inner rim has an inner cylindrical surface with an inner diameter and an outer cylindrical surface with an outer diameter. The female annulus has an outer rim and a groove. The outer rim of the female annulus has an outer diameter and inner diameter. The groove of the female annulus has an outer diameter and an inner diameter. The outer diameter of the groove is coterminous with the inner diameter of the outer rim of the female annulus.

The inner rim of the male annulus fits into the groove of the female annulus. The outer rim of the male annulus has an outer diameter that is greater than the outer diameter of the female annulus, allowing the male annulus outer and inner rims to nest with the female annulus outer rim and groove. This allows for a water-resistant connector. A locating feature on the female annulus mates with a mirrored locating feature on the male annulus. In this way, with the male annulus inner rim fitting into the female annulus groove and with the locating features aligning, the connector can only nest and go together one way.

A threaded fastener is screwed through the inner diameters of the male annulus and the female annulus. The head of the threaded fastener can contact the top surface of the male annulus. In an alternative embodiment, the male annulus has a larger inner diameter disposed towards the top surface and a smaller inner diameter disposed towards the bottom surface with an intervening flange. A threaded fastener fits inside the larger inner diameter with the fastener head contacting the flange to hold the male annulus to the female annulus. In this way, the screw-head is recessed. Driving the threaded fastener with the proper torque insures that the pins and receptacles are properly mated.

Integral, rigid conduit leads to both the male annulus and female annulus. The integral, rigid conduit holds a wire bundle with wires corresponding to the respective pins and receptacles of the male and female annulus. The integral, rigid conduit allows connectors and wire harness to be connected with only one fastener at each end. The integral, rigid conduit does not require any additional structural support. The conduit holding the harness wires can be shaped and sized, as appropriate, to fit in a particular application. In this way, the present invention allows for standardization of the installation process, while allowing for customer harnesses to be housed in the conduit. In an alternative embodiment, the conduit can be a solid molding, with the wires insert molded and/or over-molded, thereby encapsulating the wire bundle. In another alternative embodiment, the conduit, itself, can be integrated or otherwise molded into a body panel.

Connection between the pins and receptacles on the one hand, and the harness wiring bundle carried by the conduit on the other hand, can be accomplished in a number of different ways. The male and female annulus can each be formed as a two-piece assembly. In their unfinished state, the male and female annulus would have a connector to attach each individual wire to its respective pin or receptacle. This could be done with solder, crimping, snap-fitting, or a threaded fastener. Additionally, the male and female annulus can be constructed with leads to connect with the exterior wires of the conduit. The leads would connect each wire to its respective pin or receptacle. Connection between the leads and the individual wires could be accomplished using metal bonding, soldering, crimping, threaded fasteners, or snap-fit fasteners.

In an alternative embodiment, the integral, rigid conduit can be integrated into vehicle body panels, further easing the assembly of the connector and harness. In this embodiment, the connectors are exposed while the harness is embedded into a body panel.

The surfaces of the male and female annulus can be fabricated from a wide variety of environmentally durable, structural polymers poly(methyl-methacrylate) ("PMMA"), polycarbonate ("PC"), acrylonitrile butadiene styrene ("ABS"), polypropylene ("PP"), high-density polyethylene ("HDPE"), and low-density polyethylene ("LDPE"). The pins and receptacles are fabricated from copper or other conductive metals such as aluminum, steel, an alloy of copper, an alloy of aluminum, or an alloy of steel. Either or both of the pins and receptacles can be coated with an alloy of tin, silver, and/or antimony. The pins and receptacles can be insert molded into the male and female annulus, respectively. The conduit can be made of steel, steel alloys, aluminum, aluminum alloys, zinc, powdered metal, PMMA, PC, ABS, PP, HDPE, or LDPE. The conduit carries electrical wires. The electrical wires can be insert-molded and/or over-molded into the conduit. The electrical wires can also be encapsulated in powdered metal by sintering the powdered metal around the electrical wires.

The integral, rigid conduit is durably bonded to respective male or female annulus, using one or more of the following: crimping, clamps, adhesive, heat staking, heat bonding, vacuum forming, over-molding, or snap fitting.

BRIEF DESCRIPTION OF THE DRAWINGS

The present invention is illustrated with 10 figures on 10 sheets.

DETAILED DESCRIPTION OF THE DRAWINGS

The following descriptions are not meant to limit the invention, but rather to add to the summary of invention, and illustrate the present invention, by offering and illustrating various embodiments of the present invention, an integrated electrical harness and connector. While embodiments of the invention are illustrated, and described, the embodiments herein do not represent all possible forms of the invention. Rather, the descriptions, illustrations, and embodiments are intended to teach and inform without limiting the scope of the invention.

Figure 1:
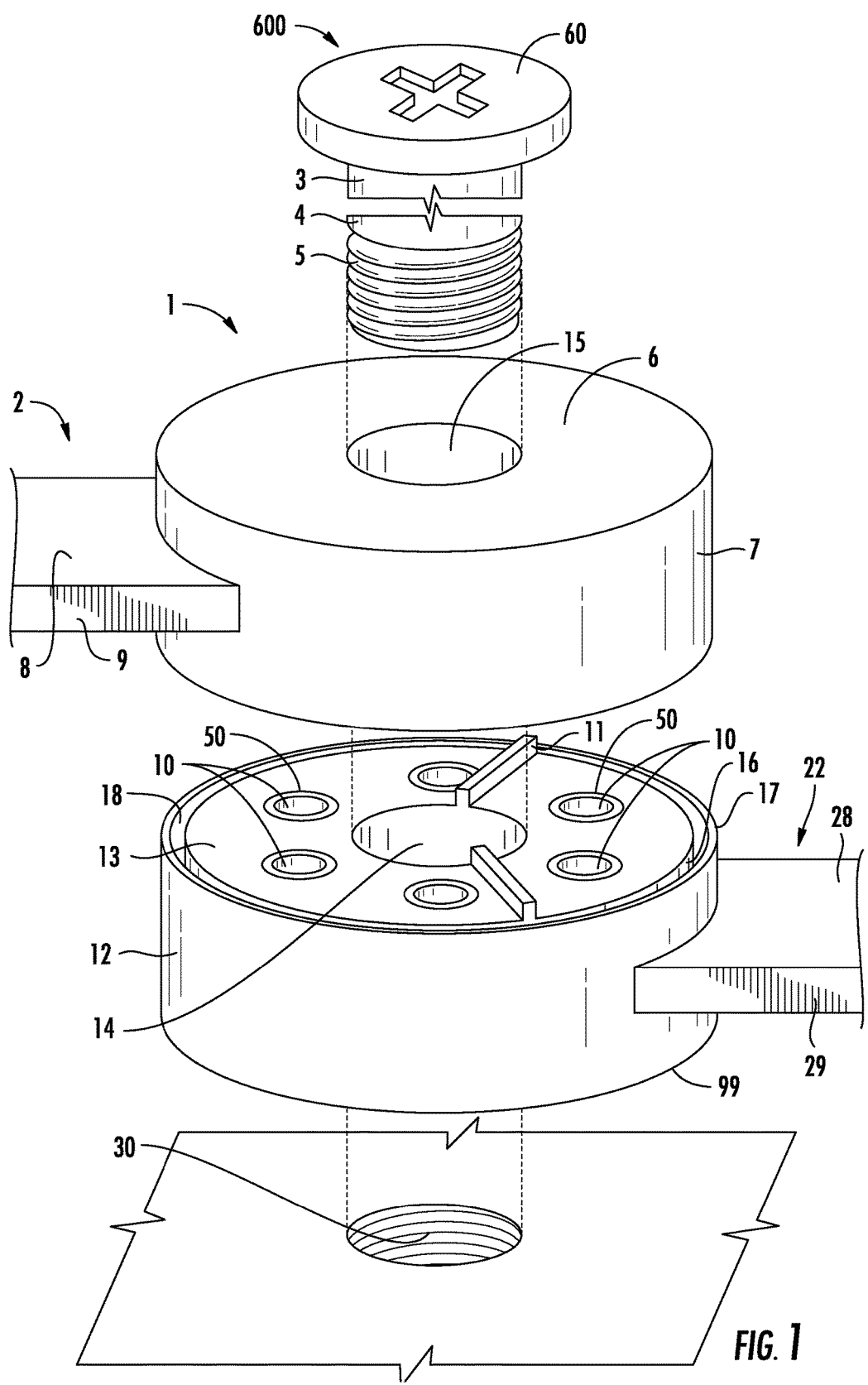
FIG. 1 is a raised isometric view of the present invention, an integrated electrical harness and connector.
Figure 2:
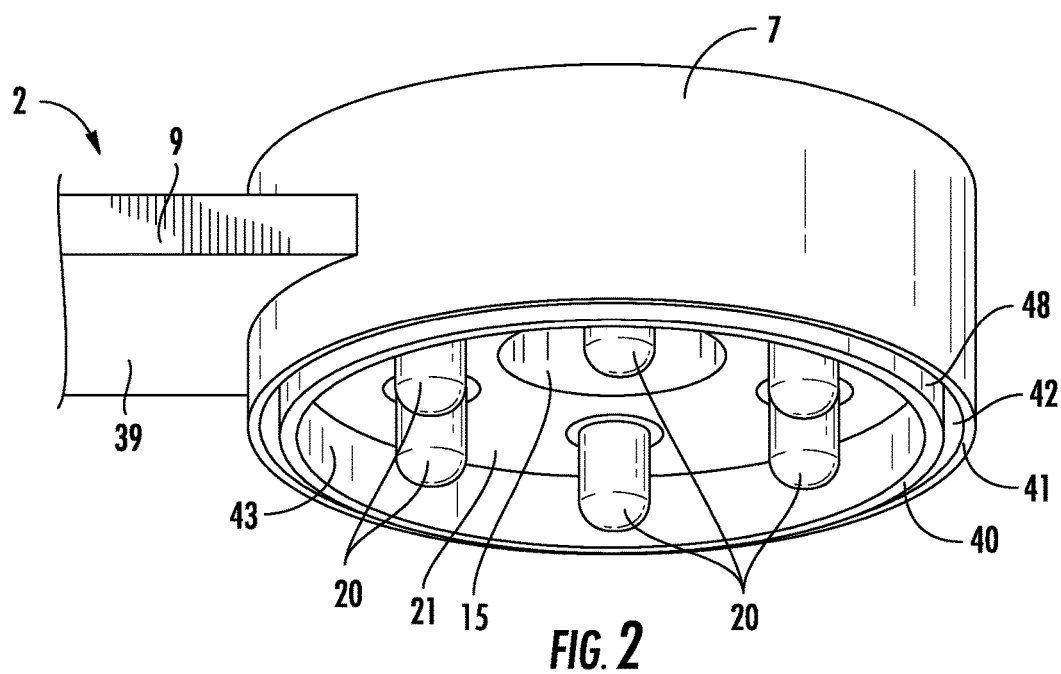
FIG. 2 is a lowered isometric view of the male annulus.

FIGS. 1-2 show the present invention comprising a male annulus 1, a female annulus 99, a male conduit 2 connected to the male annulus 1, and a female conduit 22 connected to the female annulus 99. The male annulus 1 has an outer cylindrical surface 7 with a defined outer diameter, an inner cylindrical surface 15 with a defined inner diameter, a substantially planar annular top surface 6, and a substantially planar annular bottom surface 21 with a plurality of cylindrical connector pins 20 arranged in a circular pattern. In this embodiment, there are six (6) pins 20, but any number can be used. In this embodiment, the pins 20 are arranged in a circular pattern, but any pattern could be used within the constraints of the surface shape 21 containing the pins 20. The pins 20 are made of conductive material such as copper, steel, aluminum, an alloy of copper, an alloy of steel, or an alloy of aluminum. The pins 20 may optionally be treated with a eutectic mixture of at least one of tin, silver and antimony.

The substantially planar annular surface 21 is recessed. The male annulus 1 has an outer rim 41 and an inner rim 40. The inner rim 40 has an inner cylindrical surface 43 with a defined inner diameter, and an outer cylindrical surface 48 with a defined outer diameter. The outer rim 41 has an inner cylindrical surface 42 with a defined inner diameter and its outer cylindrical surface 7 is the outer cylindrical surface 7 for the male annulus 1.

The female annulus 99 has an outer cylindrical surface 12, an inner cylindrical surface 14, and a substantially planar annular top surface 13. The substantially planar annular top surface 13 has at least the same number of connector receptacles 10, 50 as the male annulus has pins 20. The connector receptacles 10, 50 are arranged in a pattern matching that of the pins 20 of the male annulus 1. The receptacles have a cylindrical portion 10, into which the pin 20 inserts, and a flange 50. Both the cylindrical portion 10 and the flange 50 are made of conductive material such as copper, steel, aluminum, an alloy of copper, an alloy of steel, or an alloy of aluminum. The cylindrical portion of the receptacle 10 and/or the flange 50 may optionally be treated with a eutectic mixture of at least one of tin, silver and antimony.

Figure 10:
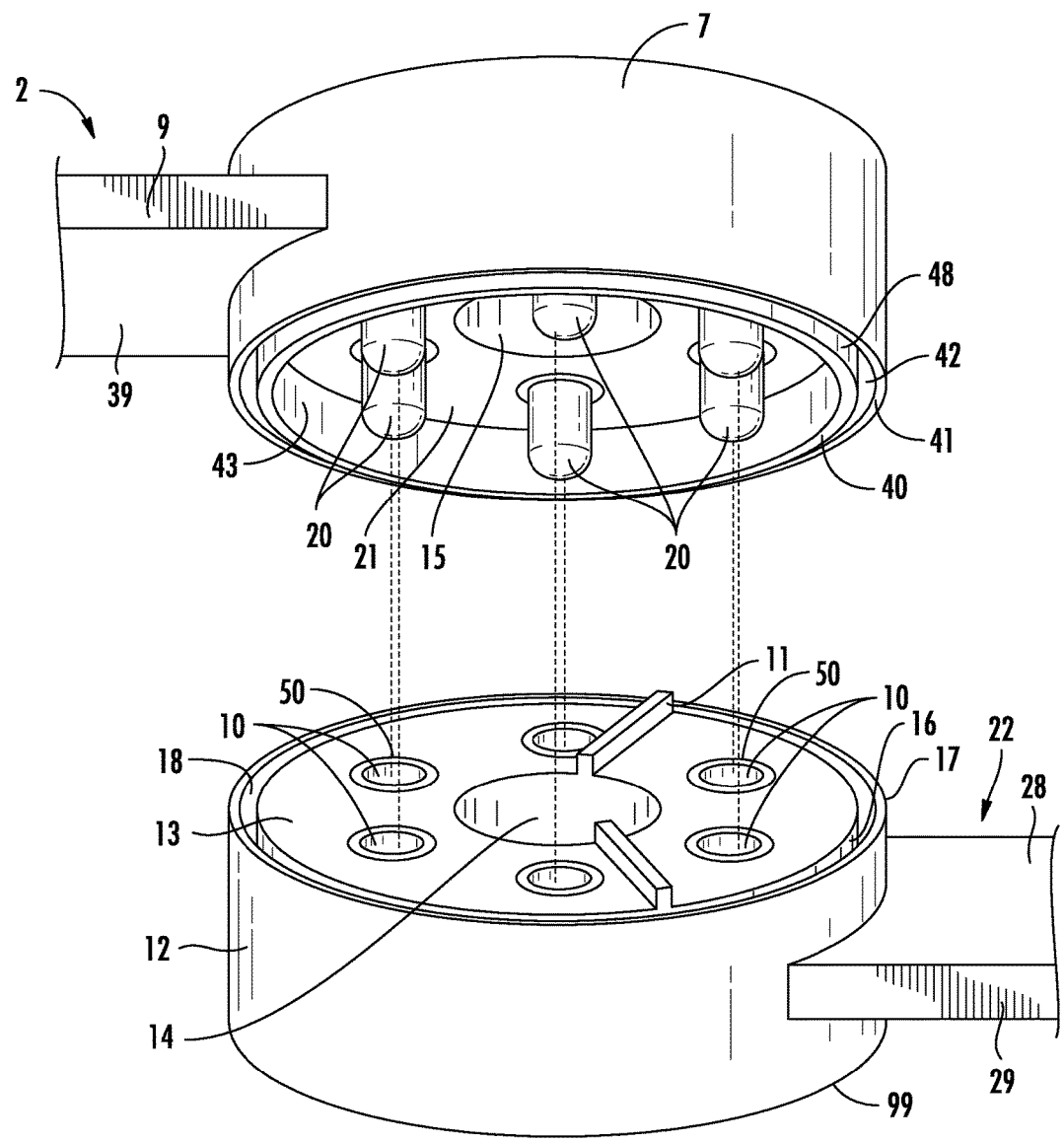
FIG. 10 is a raised exploded isometric of present invention.

The planar annular top surface 13 is not recessed in this embodiment, although it may be recessed. The female annulus has an outer cylindrical surface 12, with a defined diameter, that has a rim 17 and an inner cylindrical surface 18, which also has a defined diameter. An outer cylindrical surface 16, which has a defined diameter, is separated from the inner cylindrical surface 18 by a gap or groove. The inner cylindrical surface 16 is contiguous with the planar annular top surface 13. The defined diameter of the outer cylindrical surface 16 of the female annulus 99 is less than the defined inner diameter of the inner cylindrical surface 43 of the male annulus 1 inner rim 40. The male annulus 1 inner rim 40 fits in the gap or groove between the outer cylindrical surface 16 and inner cylindrical surface 18 of the female annulus 99. The inner cylindrical surface 42 of the male annulus 1 is greater than the outer cylindrical surface 12 of the female annulus 99. As a result, the male annulus 1 and female annulus 99 nest together. A locating feature 11 on the planar annular top surface 13 of the female annulus 99 aligns and mates with a receptacle feature on the male annulus 1. See FIG. 10. In this way, the male annulus 1 and the female annulus 99 can be used in a water-resistant application.

A threaded fastener 600 with a screw-head 60, a shank 3, 4, and threads 5 fits into the inner cylinder 15 of the male annulus 1. The threaded fastener 600 tightly threads into the threaded opening 30. The screw-head 60 contacts the substantially planar annular top surface 6 of the male annulus 1. The shank 3, 4 and threads 5 fit inside the inner cylindrical surface 15 of the male annulus and inner cylindrical surface 14 of the female annulus 99. By driving, together, the male annulus 1 and the female annulus 99 using the prescribed torque applied to the threaded fastener 600, the plurality of pins 20 are inserted snuggly and repeatably into the receptacle 10, 50. The prescribed torque is typically measured experimentally with prototypes, and depends on the actual configurations of the male annulus and female annulus.

A male conduit 2 is connected, electrically, to the pins 20 of the male annulus 1. A female conduit 22 is connected, electrically, to the receptacles of the female annulus 99. The conduit 2, 22 in this embodiment has a rectangular cross-section with a lateral surface 9, 29 and a top surface 8, 28 visible in FIG. 1. In FIG. 2, the bottom surface 39 of the conduit 2 is visible. The conduit 2, 22 can be any cross-section such as rectangular, round, square.

Connection between the pins 20 and receptacles 10, 50 on the one hand, and the harness wiring bundle carried by the conduit 2, 22 on the other hand, can be accomplished in a number of different ways that are standard in the electronics industry. The male 1 and female annulus 99 can each be formed as a two-piece assembly. In their unfinished state, the male 1 and female annulus 99 have a connector to attach each individual wire to its respective pin 20 or receptacle 10, 50. This is done with solder, crimping, snap-fitting, or a threaded fastener. Additionally, the male 1 and female annulus 99 may be constructed with leads to connect with the exterior wires of the conduit. The leads connect each wire to its respective pin 20 or receptacle 10, 50. Connection between the leads and the individual wires is accomplished using metal bonding, soldering, crimping, threaded fasteners, or snap-fit fasteners.

The body of the male 1 and female 99 annuluses are fabricated from a wide variety of environmentally durable, structural polymers such as PMMA, PC, ABS, PP, HDPE, PS, and LDPE. The pins 20 and receptacles 10, 50 are fabricated from at least one of copper, steel, aluminum, an alloy of copper, an alloy of steel, or an alloy of aluminum. Either or both of the pins 20 and receptacles 10, 50 may be coated with a eutectic alloy of tin, silver, and/or antimony. The pins 20 and receptacles 10, 50 can be insert molded into the male and female annulus, respectively. The conduit 2, 22 can be made of steel, steel alloys, aluminum, aluminum alloys, zinc, powdered metal, PMMA, PC, ABS, PP, HDPE, or LDPE. The conduit 2, 22 carries coated electrical wires. The wires are copper with, typically, a polyimide, polyamide, PP, or nylon coating. The electrical wires can be encapsulated in a solid conduit 2, 22 by over-molding, insert-molding, and/or sintering.

The integral, rigid conduit 2, 22 is durably bonded to, respectively, the male 1 or female 99 annuluses, using one or more of the following: crimping, clamps, adhesive, heat-staking, heat-bonding, vacuum-forming, over-molding, or snap-fitting.

Figure 3:
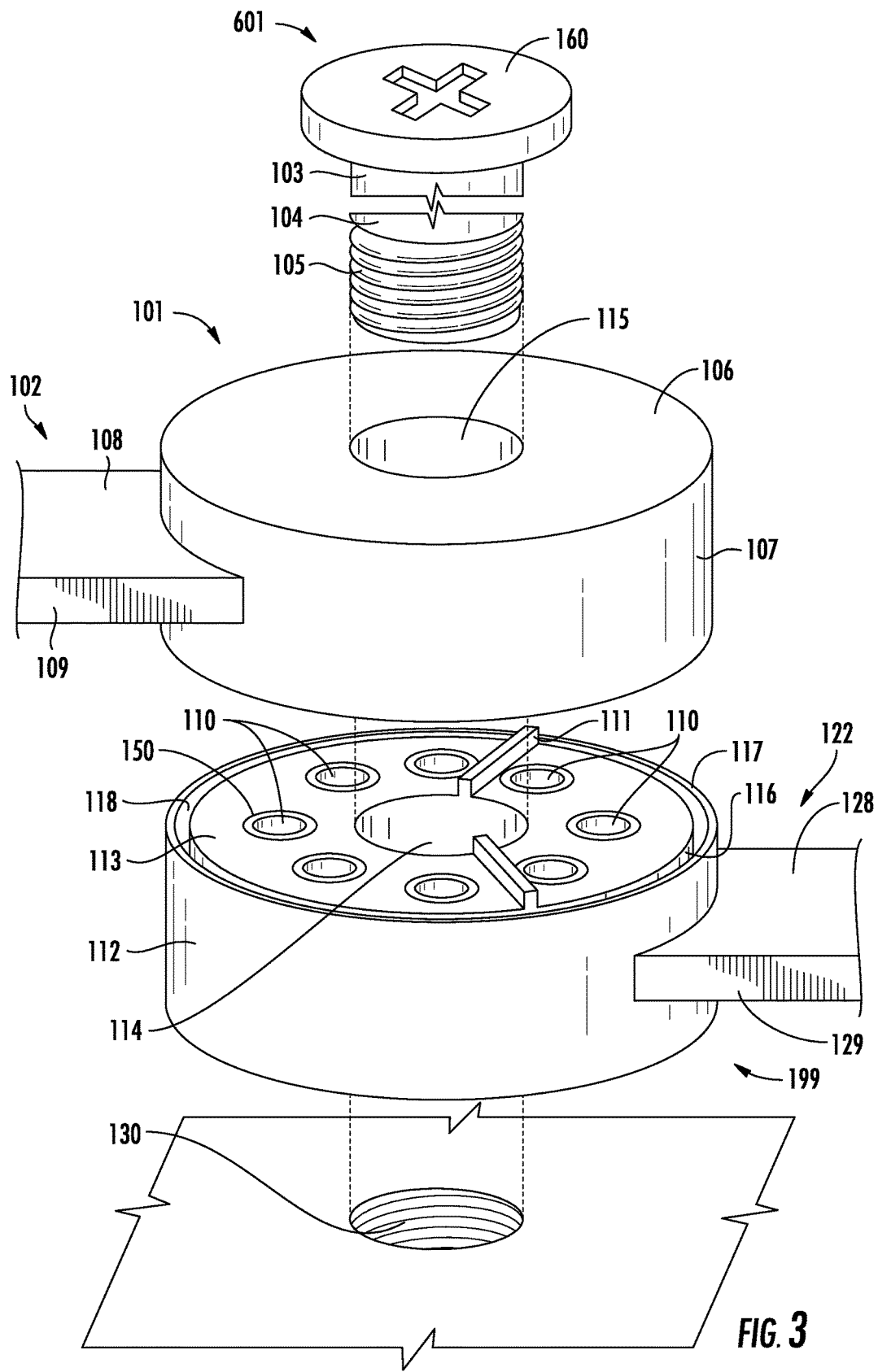
FIG. 3 is a raised isometric view of an alternative embodiment of the present invention.
Figure 4:
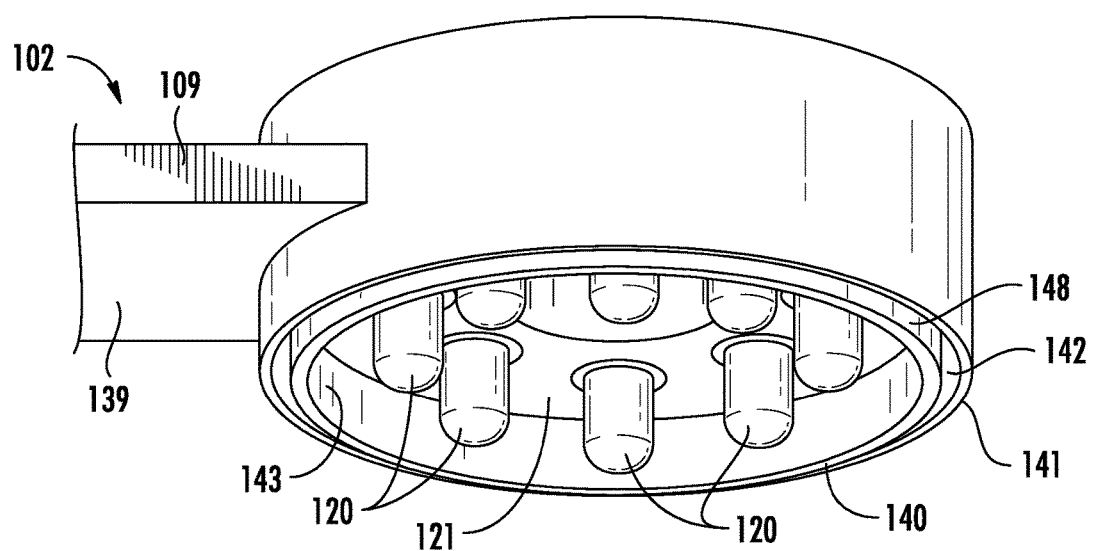
FIG. 4 is a lowered isometric view of the male annulus of the alternative embodiment shown in FIG. 3.

FIG. 3-4 show an alternative embodiment with eight (8) pins 120 and receptacles 110, 150. The alternative embodiment comprises a male annulus 101, a female annulus 199, a male conduit 102 connected to the male annulus 101, and a female conduit 122 connected to the female annulus 199. The male annulus 101 has an outer cylindrical surface 107 with a defined outer diameter, an inner cylindrical surface 115 with a defined inner diameter, a substantially planar annular top surface 106, and a substantially planar annular bottom surface 121 with a plurality of connector pins 120. In this embodiment, there are eight (8) pins 120, arranged in a circular pattern. The pins 120 are made of conductive material such as copper, steel, aluminum, an alloy of copper, an alloy of steel, or an alloy of aluminum. The pins 120 may optionally be treated with a eutectic mixture of at least one of tin, silver and antimony.

The substantially planar annular surface 121 is recessed. The male annulus 101 has an outer rim 141 and an inner rim 140. The inner rim 140 has an inner cylindrical surface 143 with a defined inner diameter, and an outer cylindrical surface 148 with a defined outer diameter. The outer rim 141 has an inner cylindrical surface 142 with a defined inner diameter and its outer cylindrical surface 107 is the outer cylindrical surface 107 for the male annulus 101.

The female annulus 199 has an outer cylindrical surface 112, an inner cylindrical surface 114, and a substantially planar annular top surface 113. The substantially planar annular top surface 113 has at least the same number of connector receptacles 110, 150 as the male annulus has pins 120. The connector receptacles 110, 150 are arranged in a pattern matching that of the pins 120 of the male annulus 101. The receptacles have a cylindrical portion 110 and a flange 150. Both the cylindrical portion 110 and the flange 150 are made of conductive material such as copper, steel, aluminum, an alloy of copper, an alloy of steel, or an alloy of aluminum. The cylindrical portion of the receptacle 110 and/or the flange 150 may optionally be treated with a eutectic mixture of at least one of tin, silver and antimony.

The planar annular top surface 113 is not recessed. The female annulus has an outer cylindrical surface 112, with a defined diameter, that has a rim 117 and an inner cylindrical surface 118, which also has a defined diameter. An outer cylindrical surface 116, which has a defined diameter, is separated from the inner cylindrical surface 118 by a gap or groove. The inner cylindrical surface 116 is contiguous with the planar annular top surface 113. The defined diameter of the outer cylindrical surface 116 of the female annulus 199 is less than the defined inner diameter of the inner cylindrical surface 143 of the male annulus 101 inner rim 140. The male annulus 101 inner rim 140 fits in the gap or groove between the outer cylindrical surface 116 and inner cylindrical surface 118 of the female annulus 199. The inner cylindrical surface 142 of the male annulus 101 is greater than the outer cylindrical surface 112 of the female annulus 199. As a result, the male annulus 101 and female annulus 199 nest together. A locating feature 111 on the planar annular top surface 113 of the female annulus 199 aligns and mates with a receptacle feature on the male annulus 101.

A threaded fastener 601 with a screw-head 160, a shank 103, 104, and threads 105. The threaded fastener 601 tightly threads into the threaded opening 130. The screw-head 160 contacts the substantially planar annular top surface 106 of the male annulus 101. The shank 103, 104 and threads 105 fit inside the inner cylindrical surface 115 of the male annulus 101 and inner cylindrical surface 114 of the female annulus 199. By driving, together, the male annulus 101 and the female annulus 199, using the prescribed torque applied to the threaded fastener 601, the plurality of pins 120 are inserted snuggly and repeatably into the receptacle 110, 150. The prescribed torque is typically measured experimentally with prototypes, and depends on the actual configurations of the male annulus and female annulus.

A male conduit 102 is connected, electrically, to the pins 120 of the male annulus 102. A conduit 122 is connected, electrically, to the receptacles 110, 150 of the female annulus 199. The conduit 102, 122 in this embodiment has a rectangular cross-section with a lateral surface 109, 129 and a top surface 108, 128 visible in FIG. 3. In FIG. 4, the bottom surface 139 of the conduit 102 is visible. The conduit 102, 122 can be any cross-section such as rectangular, round, square.

Connection between the pins 120 and receptacles 110, 150 on the one hand, and the harness wiring bundle carried by the conduit 102, 122 on the other hand, can be accomplished in a number of different ways that are standard in the electronics industry. The male 101 and female annulus 199 can each be formed as a two-piece assembly. In their unfinished state, the male 101 and female annulus 199 would have a connector to attach each individual wire to its respective pin 120 or receptacle 110, 150. This could be done with solder, crimping, snap-fitting, or a threaded fastener. Additionally, the male 1 and female annulus 199 can be constructed with leads to connect with the exterior wires of the conduit. The leads would connect each wire to its respective pin 120 or receptacle 110, 150. Connection between the leads and the individual wires could be accomplished using metal bonding, soldering, crimping, threaded fasteners, or snap-fit fasteners.

The body of the male 101 and female 199 annuluses can be fabricated from a wide variety of environmentally durable, structural polymers such as PMMA, PC, ABS, PP, HDPE, PS, and LDPE. The pins 120 and receptacles 110, 150 are fabricated from copper or other conductive metals such as aluminum or steel. Either or both of the pins 120 and receptacles 110, 150 can be coated with an alloy of tin, silver, and/or antimony. The pins 120 and receptacles 110, 150 can be insert molded into the male and female annulus, respectively. The conduit 102, 122 can be made of steel, steel alloys, aluminum, aluminum alloys, zinc, powdered metal PMMA, PC, ABS, PP, HDPE, or LDPE. The conduit 102, 122 carries coated wires. The wires are copper with, typically, a polyimide coating, polyamide coating, a PP coating, or nylon coating. The conduit 102, 122 can be a hollow structure, like a tube. The conduit 102, 122 can be a solid structure by insert molding, over-molding, and/or sintering the wire bundle into a solid structure.

Figure 9:
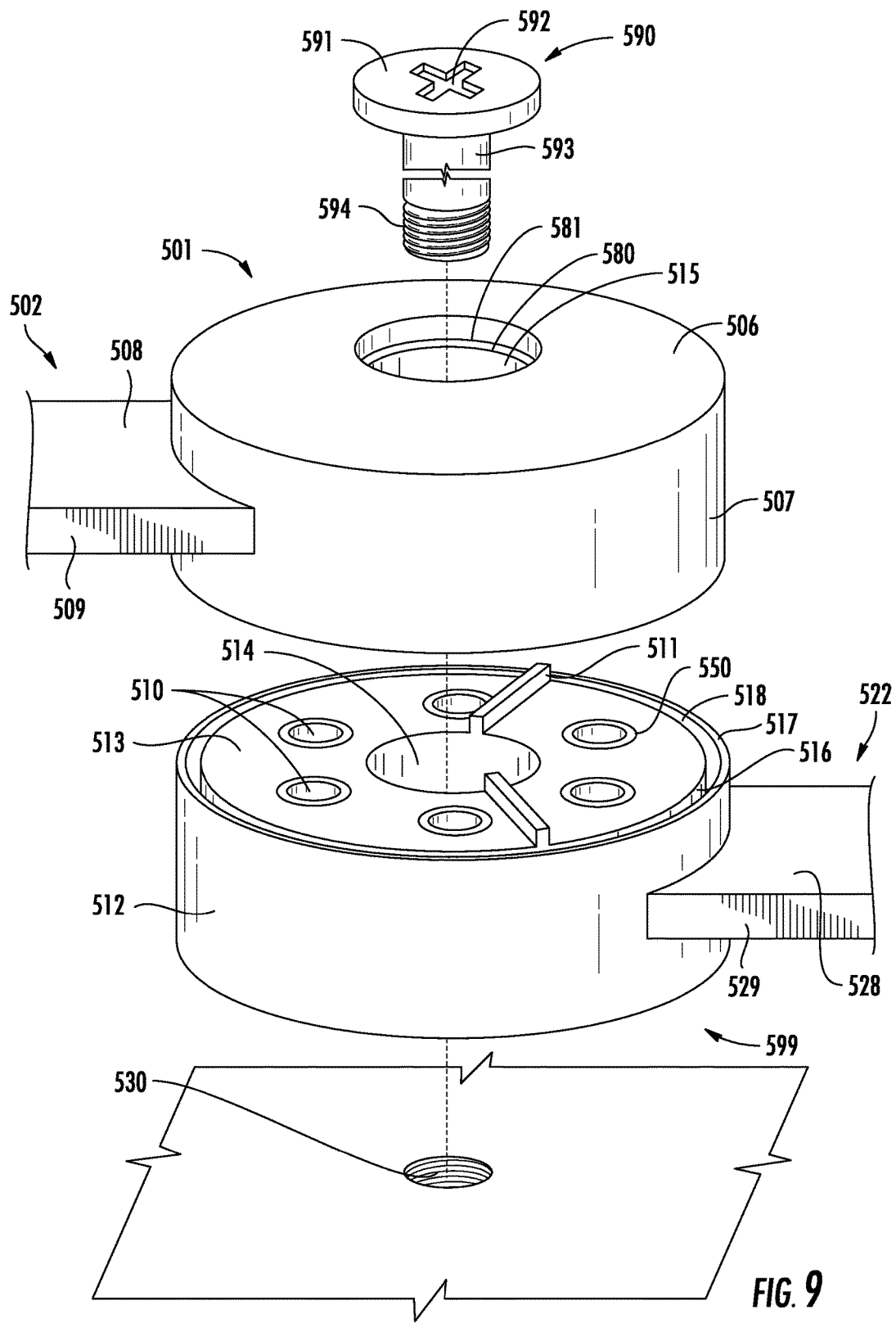
FIG. 9 is a raised isometric view of an alternative embodiment of the present invention, allowing for a recessed threaded fastener screw-head.

The integral, rigid conduit 102, 122 is durably bonded to respective male 101 or female 199 annuluses, using one or more of the following: crimping, clamps, adhesive, heat staking, heat bonding, vacuum forming, over-molding, or snap FIG. 9 shows another alternative embodiment of the present invention, with six (6) pins and receptacles 510, 550. The alternative embodiment comprises a male annulus 501, a female annulus 599, a conduit 502 connected to the male annulus 501, and a conduit 522 connected to the female annulus 599. The conduit 502, 522 has a top surface 508, 528 and a side surface 509, 529. The male annulus 501 has an outer cylindrical surface 507 with a defined outer diameter, an inner cylindrical surface 515 with a defined inner diameter, and a substantially planar annular surface 506.

The female annulus 599 has an outer cylindrical surface 512, an inner cylindrical surface 514, and a substantially planar annular top surface 513. The substantially planar annular top surface 513 has at least the same number of connector receptacles 510, 550 as the male annulus has pins (not shown). The connector receptacles 510, 550 are arranged in a pattern matching that of the pins (not shown) of the male annulus 501. The receptacles have a cylindrical portion 510 and a flange 550.

The planar annular top surface 513 is not recessed. The female annulus has an outer cylindrical surface 512, with a defined diameter, that has a rim 517 and an inner cylindrical surface 518, which also has a defined diameter. An outer cylindrical surface 516, which has a defined diameter, is separated from the inner cylindrical surface 518 by a gap or groove. The inner cylindrical surface 516 is contiguous with the planar annular top surface 513.

The male annulus 501 and female annulus 599 nest together. A locating feature 511 on the planar annular top surface 513 of the female annulus 599 aligns and mates with a receptacle feature on the male annulus 501.

A threaded fastener 590 with a screw-head 591 with a Phillips slot 592, a shank 593, 594, and threads 595 attaches the male annulus 501 and female annulus 599. The threaded fastener 591 tightly threads into the threaded opening 530. This embodiment is made with a recessed flange 580, 581. The screw-head 591 contacts the recessed flange 580, 581, attaching the male annulus 501 and female annulus 599.

Figure 5:
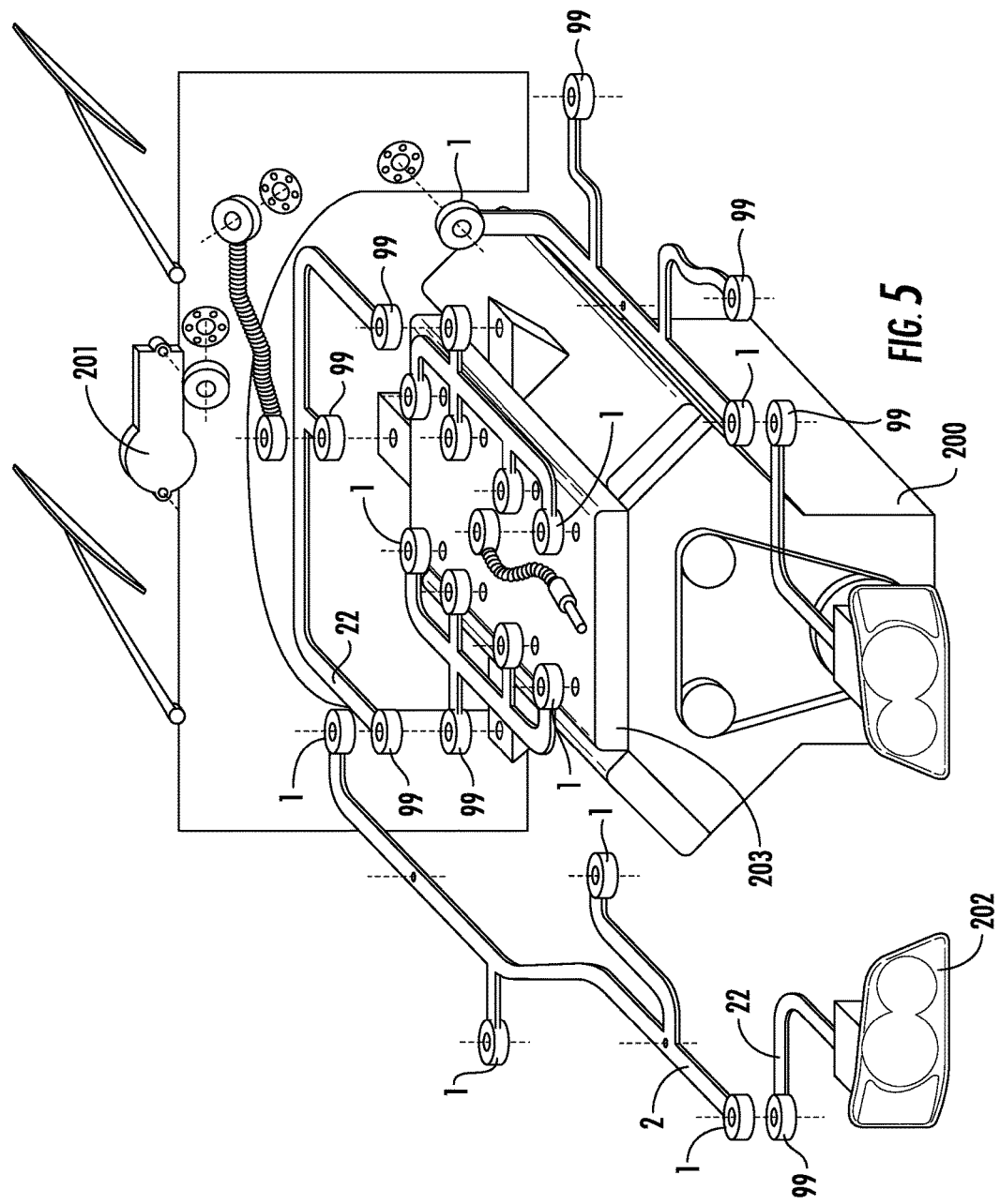
FIG. 5 is an exploded isometric view of the present invention deployed in the engine bay of a motor vehicle.

FIG. 5 shows the present invention implemented in a motor vehicle engine 200 compartment. A plurality of male annulus 1 and female annulus 99, and the associated conduit 2, 22, provide electrical connections to a number of different loads: headlights 202, wiper motor 201, cylinder-head/electronic fuel injectors 203. The present invention standardizes the connection made between the male annulus 1 and the female annulus 99 using a threaded fastener 600. In this way, it improves reliability while standardizing assembly and reducing assembly costs.

Figure 6:
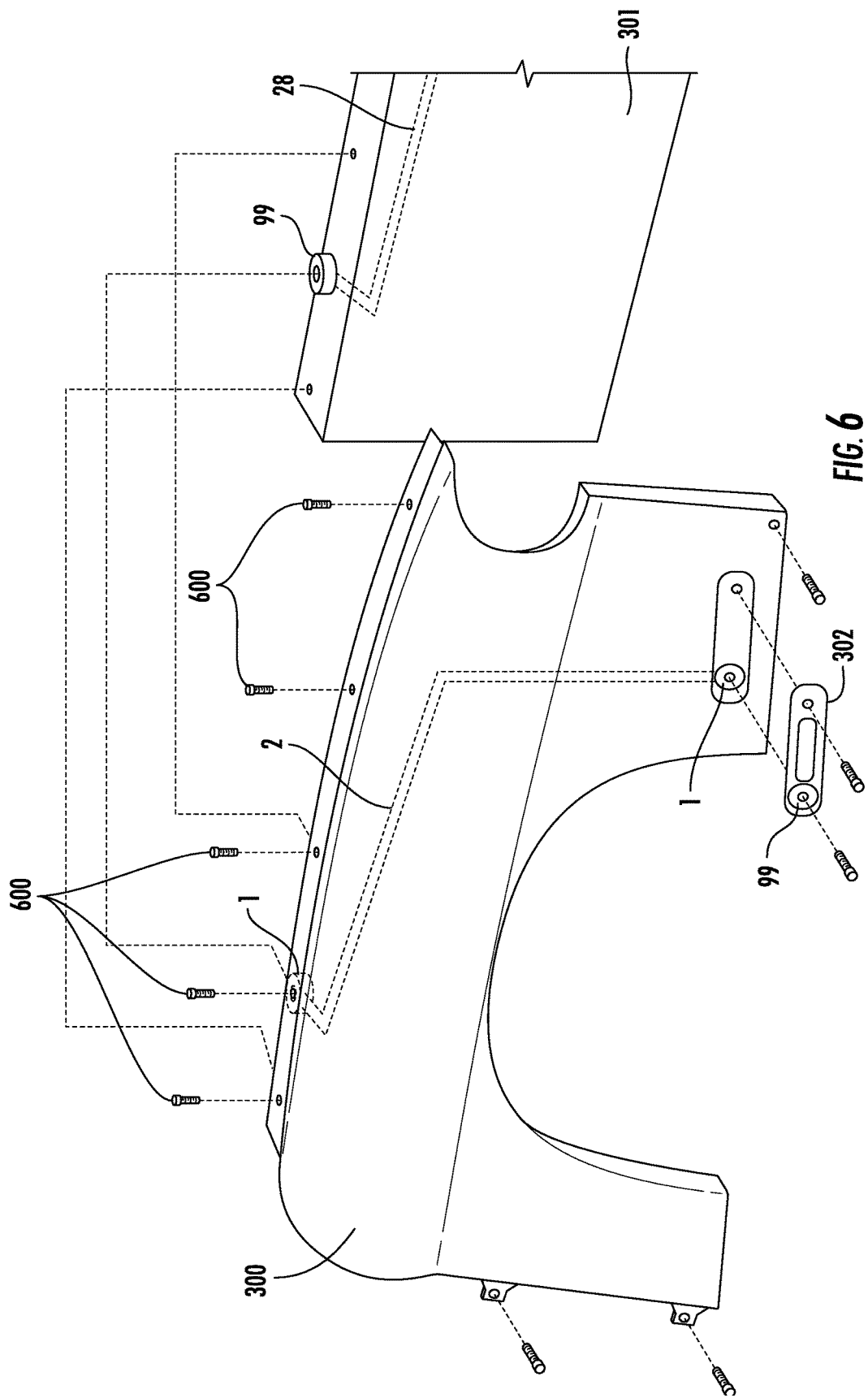
FIG. 6 is an exploded isometric view of the present invention deployed on motor vehicle body panels.
Figure 8:
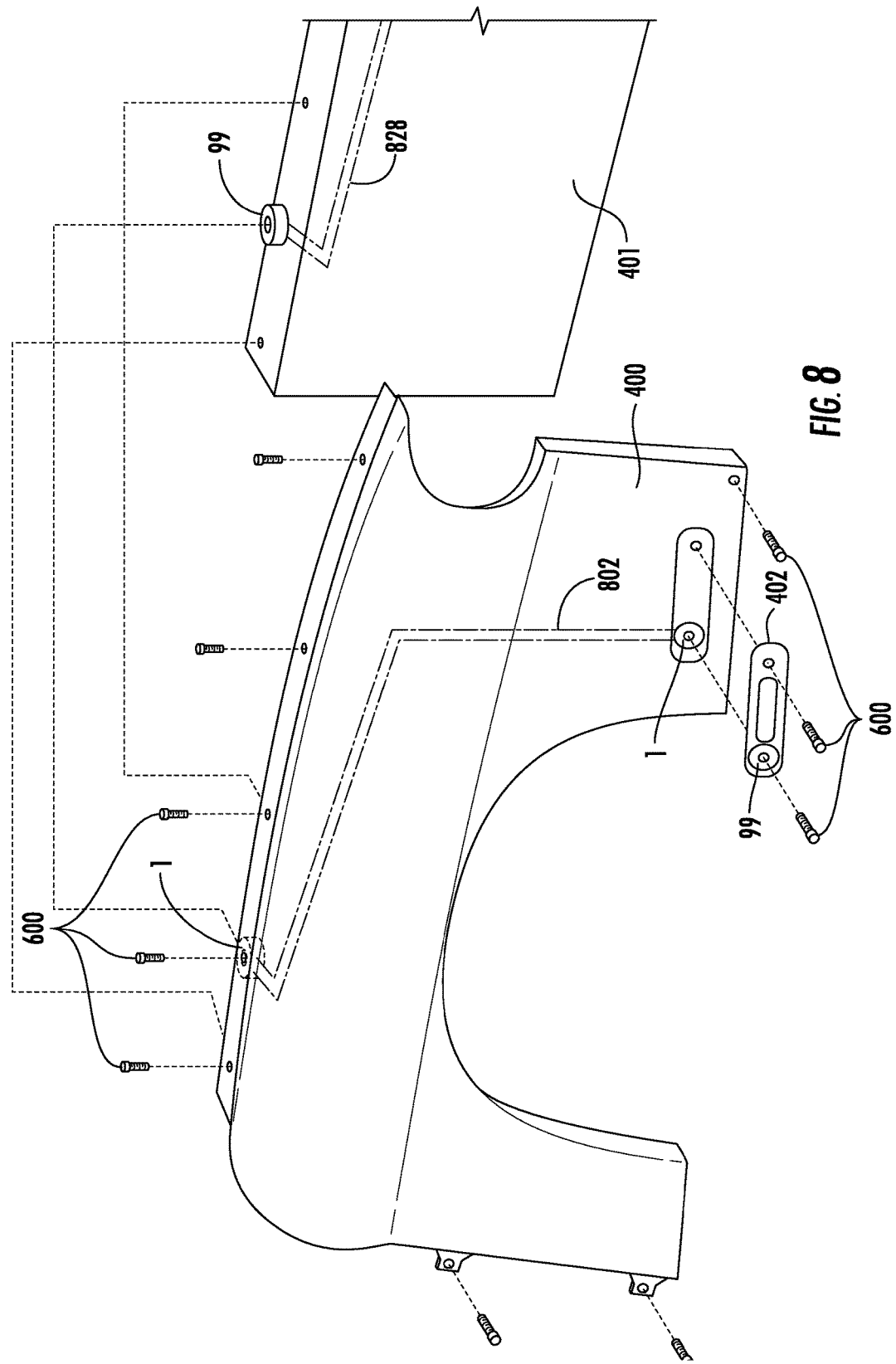
FIG. 8 is an exploded isometric view of an alternative embodiment of the present invention deployed on motor vehicle body panels in which the harness is integrated into the body panel.

FIG. 6 shows the present invention implemented in a motor vehicle on a quarter panel 300. The quarter panel 300 is connected to the frame or unibody 301 with a plurality of threaded connectors 600. The plurality of threaded connectors 600 make connections between the male annulus 1 and female annulus 99, electrically connecting the conduits 2, 22. In this way, any electrical load 302 in the quarter panel 300 can be electrified without additional assembly steps. The normal threaded fasteners 600 will connect the electrical circuit. FIG. 8 shows an alternative embodiment for implementing the present invention into a quarter panel 400 of a vehicle. The quarter panel 400 is connected to the frame or unibody 401 with a plurality of threaded connectors 600. The plurality of threaded connectors 600 make connections between the male annulus 1 and female annulus 99. In this embodiment, the conduit 802, 828 are now integrated into the quarter panel and frame assemblies, themselves. In this way, any electrical load 402 in the quarter panel 400 can be electrified without additional assembly steps, with the electrical conduit 802, 828 integrated into the automotive parts, themselves. The normal threaded fasteners 600 will connect the electrical circuit.

Figure 7:
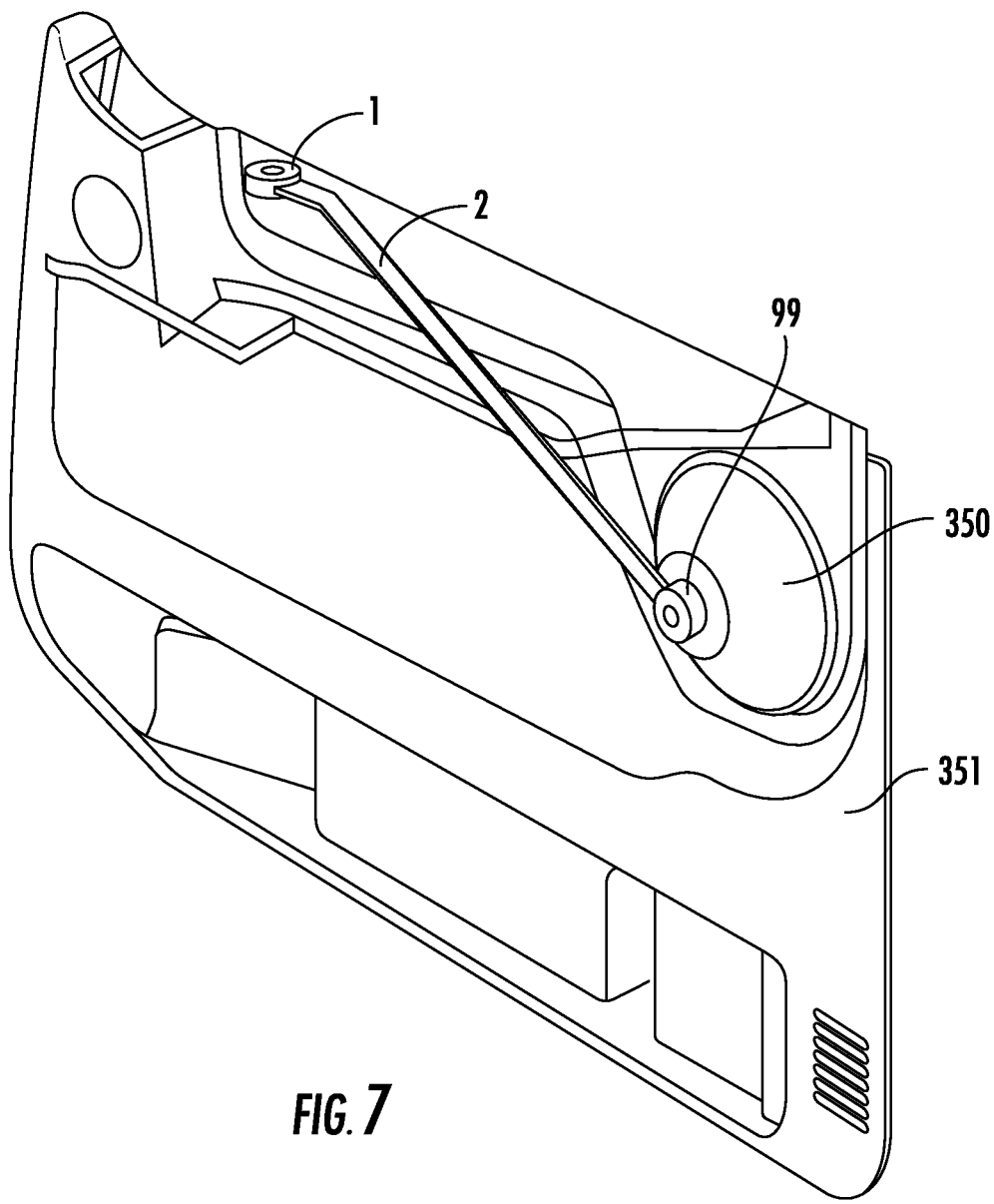
FIG. 7 is an isometric view of the present invention deployed on a door panel of a motor vehicle.

FIG. 7 shows another application of the present invention. The present invention used on a door panel 351 to connect a loudspeaker 350 to an external power source through the female annulus 99, conduit 2, and male annulus 1. The present invention can be incorporated and integrated into a wide variety of motor vehicle applications.

I claim:

1. An integrated electrical harness and connector comprising
    a male annulus with a substantially planar annular top surface, an outer cylindrical surface with a defined outer diameter, an inner cylindrical surface with a defined inner diameter, a substantially planar annular top surface, a substantially planar annular bottom surface with a plurality of cylindrical, electrically conductive, connector pins, and a locating feature;
    a female annulus with a substantially planar annular bottom surface, an outer cylindrical surface with a defined outer diameter; an inner cylindrical surface with a defined inner diameter, and a substantially planar annular top surface with connector receptacles, equal in number and alignment to the pins in the male annulus;
    a piece of rigid conduit, designated the male conduit, durably bonded to the male annulus, containing discrete electrical connections to each pin of the male annulus;
    a piece of rigid conduit, designated the female conduit, durably bonded to the female annulus, containing discrete electrical connections to each receptacle of the female annulus;
    wherein the male annulus can be connected securely to the female annulus through the use of a threaded fastener, wherein the threaded fastener comprises at least a screw-head, a shaft, and threads, and
    wherein the threaded fastener is driven down the inner cylindrical surface of the male annulus and the inner cylindrical surface of the female annulus, making the appropriate electrical connections between the pins and receptacles and, therefore, between the electrical wires of the male conduit and the female conduit.

2. The integrated electrical harness and connector of claim 1, wherein the male annulus has at least 6 connector pins and the female annulus has at least 6 receptacles.

3. The integrated electrical harness and connector of claim 1, wherein the male annulus has at least 24 connector pins and the female annulus has at least 24 receptacles.

4. The integrated electrical harness and connector of claim 1, wherein the male annulus has at least 120 connector pins and the female annulus has at least 120 receptacles.

5. The integrated electrical harness and connector of claim 1, wherein the pins and receptacles are arranged in a circle.

6. The integrated electrical harness and connector of claim 1, wherein the male annulus and the female annulus have complementary locating and alignment features which insure that the male annulus and the female annulus are connected correctly.

7. The integrated electrical harness and connector of claim 1, wherein the male annulus further comprises a flanged surface on its inner cylindrical surface, allowing the head of a threaded fastener to be recessed.

8. The integrated electrical harness and connector of claim 1, wherein a plurality of integrated electrical harness and connectors can be inter-connected with one another.

9. The integrated electrical harness and connector of claim 1, wherein driving the threaded fastener with the correct torque into a male annulus and female annulus pair insures the connections of all pins and receptacles of that male annulus and female annulus pair.

10. The integrated electrical harness and connector of claim 1, wherein the male and female conduit connected to the male annulus and the conduit connected to the female annulus is constructed from an environmentally durable, structural material such as aluminum, zinc, steel, an alloy of aluminum, an alloy of zinc, an alloy of steel, powdered metal, PMMA, PC, ABS, PP, HDPE, PS, and LDPE.

11. The integrated electrical harness and connector of claim 10, wherein the male and female conduit are attached to the male annulus and female annulus, respectively, using at least one of crimping, clamps, adhesive, heat staking, heat bonding, vacuum forming, over-molding, or snap-fitting.

12. The integrated electrical harness and connector of claim 1, wherein the male annulus further comprises an outer rim with a defined inner and outer diameter,
    an inner rim with a defined outer and inner diameter,
    wherein the outer rim and the inner rim each have an outer cylindrical surface and an inner cylindrical surface; and wherein the substantially planar bottom surface of the male annulus is recessed.

13. The integrated electrical harness and connector of claim 12, wherein the female annulus further comprises a groove between the outer cylindrical surface of the female annulus and the substantially planar top surface of the female annulus, wherein the groove has an outer diameter and an inner diameter.

14. The integrated electrical harness and connector of claim 13, wherein the outer diameter and inner diameter of the groove of the female annulus are sized such that the inner rim of the male annulus nests within the groove, allowing the inner rim of the male annulus to act as an intervening barrier to hygroscopic migration.

15. The integrated electrical harness and connector of claim 14, wherein the recessed substantially planar bottom surface of the male annulus contacts the substantially planar top surface of the female annulus when the male annulus and the female annulus are nested.

16. The integrated electrical harness and connector of claim 15, wherein the male annulus and female annulus form a water-resistant connection because the male annulus and female annulus nest together with an intervening barrier.

17. The integrated electrical harness and connector of claim 1, wherein the male and female conduit encapsulate electrical wires, wherein each electrical wire carried by a conduit attaches electrically to at least one pin or receptacle.

18. The integrated electrical harness and connector of claim 17, wherein the male and female conduit are sized and formed to contour to the necessities of the application.

19. The integrated electrical harness and connector of claim 17, wherein the male and female conduit is integrated into a motor vehicle body panel.

20. The integrated electrical harness and connector of claim 17, wherein the male and female conduit are solid structures encapsulating the electrical wires and wherein the conduit is solid and is fabricated by insert-molding the electrical wires into the conduit structure during fabrication of the conduit.

21. The integrated electrical harness and connector of claim 17, wherein the male and female conduit are solid structures encapsulating the electrical wires and wherein the conduit is solid and is fabricated by over-molding the electrical wires into the conduit structure during fabrication of the conduit.

22. The integrated electrical harness and connector of claim 17, wherein the male and female conduit are solid structures encapsulating the electrical wires and wherein the conduit is solid and is fabricated by insert-molding and over-molding the electrical wires into the conduit structure during fabrication of the conduit.

23. The integrated electrical harness and connector of claim 17, wherein the male and female conduit are solid structures encapsulating the electrical wires and wherein the conduit is fabricated by sintering powdered metal around the electrical wires, encapsulating the electrical wires into the conduit structure during fabrication of the conduit.

24. The integrated electrical harness and connector of claim 1, wherein the pins of the male annulus and the receptacles of the female annulus are fabricated from at least one of copper, aluminum, steel, an alloy of copper, an alloy of aluminum, and an alloy of steel.

25. The integrated electrical harness and connector of claim 24, wherein the male annulus and the female annulus are fabricated from an environmentally durable, structural polymer.

26. The integrated electrical harness and connector of claim 25, wherein the environmentally durable, structural polymer is at least one of poly(methyl-methacrylate) ("PMMA"), polycarbonate ("PC"), acrylonitrile butadiene styrene ("ABS"), polypropylene ("PP"), high-density polyethylene ("HDPE"), polystyrene ("PS"), and low-density polyethylene ("LDPE").

27. The integrated electrical harness and connector of claim 25, wherein the pins of the male annulus and the receptacles of the female annulus are insert molded into the environmentally durable, structural polymer.

* * * * *